United States Patent [19]

Hashimoto

[11] Patent Number: 4,882,744

[45] Date of Patent: Nov. 21, 1989

[54] AUTOMATIC PAGING SYSTEM

[75] Inventor: Kazuo Hashimoto, Tokyo, Japan

[73] Assignee: Hashimoto Corporation, Tokyo, Japan

[21] Appl. No.: 233,279

[22] Filed: Aug. 17, 1988

[30] Foreign Application Priority Data

Aug. 18, 1987 [JP] Japan .................................. 62-204842

[51] Int. Cl.⁴ ............................................... H04Q 7/04
[52] U.S. Cl. .................................... 379/57; 340/825.44
[58] Field of Search ...................... 340/125.44; 379/57, 379/63, 58, 92, 93, 91

[56] References Cited

U.S. PATENT DOCUMENTS

| 4,072,824 | 2/1978 | Phillips | 379/58 |
| 4,490,579 | 12/1984 | Godoshian | 340/825.44 |
| 4,618,860 | 10/1986 | Mori | 340/825.44 |
| 4,625,081 | 11/1986 | Lotito et al. | 379/88 |
| 4,704,608 | 11/1987 | Sato et al. | 340/825.44 |

FOREIGN PATENT DOCUMENTS 2140253 11/1984 United Kingdom .................. 379/57

Primary Examiner—Robert Lev
Attorney, Agent, or Firm—Lowe, Price, LeBlanc, Becker & Shur

[57] ABSTRACT

An automatic paging system which can handle a calling for both subscribers of conventional (old) beepers without a message display function and new type beepers wherein a message, such as his telephone number, from a calling party can be displayed, when the paging number of a subscriber is automatically performed at a voice mail center through a paging center. A discriminator determines, according to an outgoing message from the paging center, whether the old or new type beeper is to be called. In case of the old type beeper, the line is disengaged after about 10 seconds, and in case of the new type beeper with message display capability, the line is disengaged after the calling party sends out the message to be displayed on the beeper.

2 Claims, 2 Drawing Sheets

AUTOMATIC PAGING SYSTEM

BACKGROUND OF THE INVENTION

The present invention relates to paging systems and particularly to a voice mail type paging system that communicates with a beeper capable of visually displaying messages.

Conventional (old type) paging systems are used for simply calling a beeper by a tone signal, but recently a new type of beeper for displaying a message has been produced. There is a difference between these two paging systems in an instruction message sent to a calling party when calling a paging center from an outside telephone. Thus, upon reception of an incoming call, the system discriminates between the call number of a message type beeper and that of a nonmessage type beeper, and in response, an appropriate instruction message to the calling party is sent out. The calling party must follow the instruction of the paging center when he calls from a normal telephone set. However, if paging is to be automatically performed by a conventional voice mail center, the center is required to automatically follow the appropriate instruction from the paging center.

SUMMARY OF THE INVENTION

In an automatic paging system in accordance with the invention, the difference in an outgoing message from a paging center to a calling party between one for a non-message type beeper one for a message type beeper is discriminated by a discriminating means, then according to the discrimination, in the case of the non-message type beeper the telephone line is automatically disengaged, for example, after about 10 seconds. In the case of the message type beeper, the telephone line is disengaged after a device for automatically sending a message, i.e., a telephone number, is operated, the system therefore can handle calls for both subscribers of non-message type and message type beepers.

The above and other objects, features and advantageous of the present invention will become more apparent from the following description when taken in conjunction with the accompanying drawings in which a preferred embodiment of the present invention is shown by way of illustrative example.

DESCRIPTION OF THE PREFERRED EMBODIMENTS

The detailed description of the preferred embodiments according to the present invention will be now described with reference to the accompanying drawings.

Figure 1:
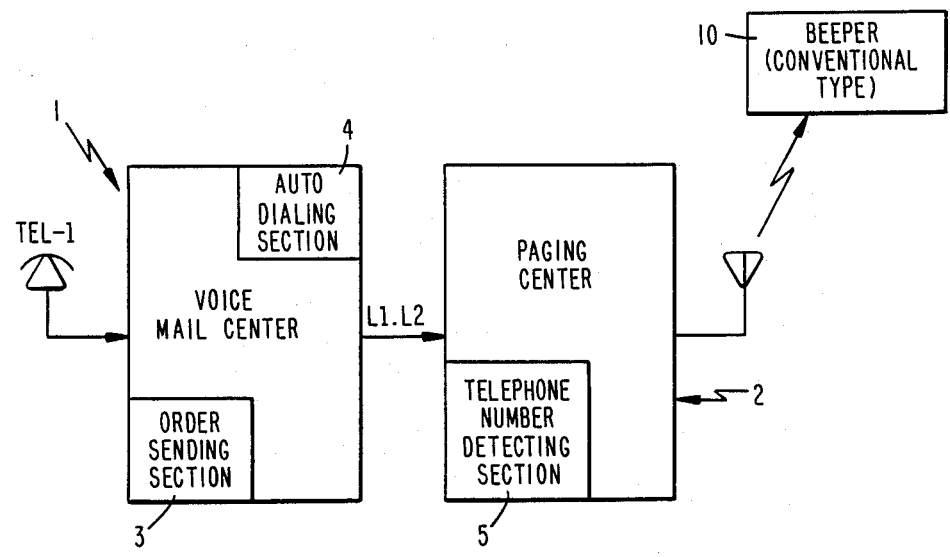
FIG. 1 is a schematic diagram of a conventional paging system without a display capability.
Figure 2:
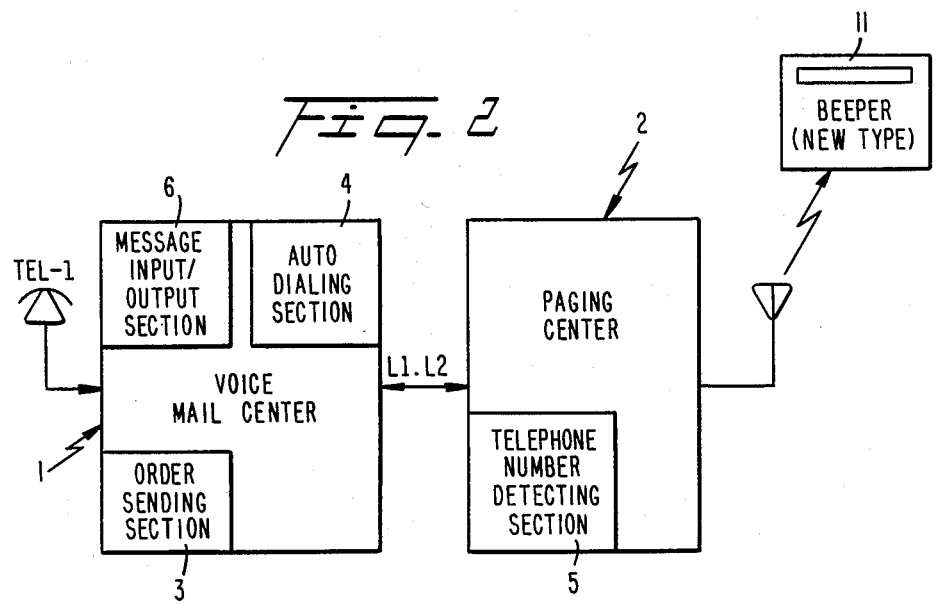
FIG. 2 is a schematic diagram of a conventional paging system having display capability.

Referring to FIG. 1, reference numeral 1 denotes a voice mail center. When the voice mail center 1 receives a signal from a caller subscribed and registered for voice mail (hereinafter called a subscriber), the voice mail center 1 sends an order message, and the subscriber sends an identification number (hereinafter called an ID number) and a specified code number. As a result, the subscriber can hear a message from an unspecified caller which has been stored in the BOX of the subscriber. After a general unspecified caller calls a telephone number previously known to the unspecified caller, the unspecified caller inputs the BOX number of the subscriber subscribed to voice mail, and after the unspecified caller records a message for the subscriber, the unspecified caller hangs up the phone. As a result, the voice mail side calls a paging center, and the paging center calls a beeper carried by the subscriber. At this time, in a conventional type paging system, the beeper is only called, but in a new type paging system as shown in FIG. 2, the specified message, for example a telephone number of a caller, is displayed on a display.

This invention presents an automatic paging system which can deal with both operations.

Figure 3:
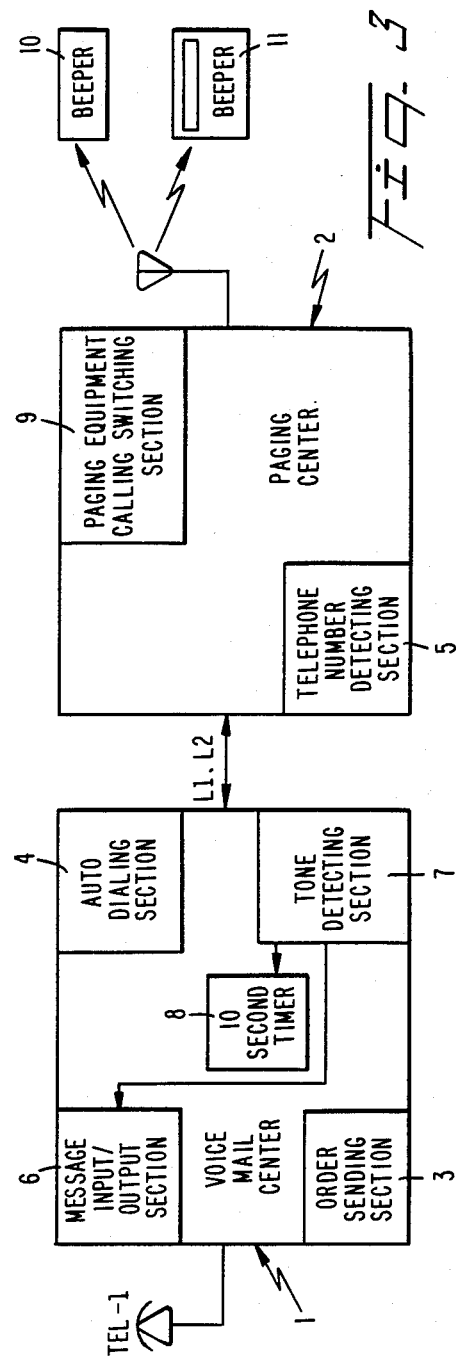
FIG. 3 is a schematic diagram of the invention.

A system and an operation of this invention will be now explained in accordance with FIG. 3. First, how a call for transmitting a message to the subscriber from the specified caller is done will be described. Namely, in the voice mail center 1, reference numeral 3 denotes an order (which means an order message) sending section. When the order sending section 3 receives a signal, the telephone line is set to a closed loop condition by a closing means, and sends an order message. Accordingly, after the specified caller sends a message and hangs up the phone, the voice mail center calls the paging center, and the paging center calls the subscriber who carries the beeper outside.

The new type paging system has a function which indicates numbers by a liquid crystal display. Accordingly, the order message, which means the method for operation, includes not only a message of "please record your message" but also the telephone number of the unspecified subscriber after the message is recorded. Thereafter the unspecified caller hangs up the phone after inputting his telephone number. As a result, the voice mail center calls the paging center, and starts to call the beeper with the message display.

Next, the function of the voice mail center will be described. Namely, in the voice mail service side, as above, after the unspecified caller hangs up the phone once, the voice mail center detects whether the subscriber subscribes to the new type beeper or to the conventional type beeper by the number previously registered. When the beeper is the conventional type, as the conventional operation, after the paging center is contacted by dialing automatically, and after the message from the paging center is heard, the telephone is hung up. However, in the new type beeper, the paging center is called by automatic dialing, after the message from the paging center is heard the telephone number of the unspecified caller is sent to the paging center, thereafter the telephone is hung up.

The above operation will now be explained more in detail. In the new type paging system, when the voice mail center 1 receives a signal from a caller, the telephone line is closed. Thereafter a secret number (box number) is input in accordance to the instruction of the order message sent from the order sending section 3, for example, "This is a VMX (voice mail center). Please input your box number", by using a pushphone TEL-1. Thereafter the unspecified subscriber can hear the box number by speech synthesis for confirming the box number. And the order message, for example "After putting No. 1, please speak your message and after, please push No. 5.", is sent. Accordingly, following the instruction, after the key "1" on the pushbutton phone is pushed, a message is given verbally and thereafter the key "5" on the pushbutton phone is pushed. As a result, the next message, for example, "if you want him to call back, please input your telephone number after this message." is sent. The specified caller inputs a telephone number by operating keys of the pushphone tEL-1 and hangs up the phone.

Continuously, the voice mail center 1 dials automatically by the auto dialing section 4, and calls the specified beeper through the telephone number detection section 5 in the paging center 2. Thereafter the voice mail center 1 sends the message (telephone number) input in the message inputting section as above to the paging center 2 and this message is displayed on the display section on the new type beeper 11. When the new type beeper 11 is started to be called by the auto dialing section 4 through the paging center 2 as the above operation, the paging center 2 gives back an announcement, for example "This is the beeper, please input your message.", and an intermittent tone, for example "Boo, boo, boo." to the voice mail center 1. The voice mail center 1 sends the message (telephone number) memorized in the message inputting section 6 to the paging center 2 during silence after detecting the announcement and the intermittent tone. As a result, this operation prevents the announcement and intermittent tone from interfering with sending a message, and the message is transmitted correctly to the paging center 2.

FIG. 3 shows a view of the paging system which is possible to be used in both the conventional type beeper and the new type beeper. Referring to FIG. 3, the paging system therein is different from the paging system in FIG. 1 and FIG. 2 as follows. In the paging system in FIG. 3, a tone detecting section 7 and a 10 second timer are set in the voice mail center, and a beeper calling switching section 9 is set in the paging center. As the above explanation, when the voice mail center dials automatically to the paging center, the paging center gives back an announcement and a tone to the voice mail center. In the new type beeper, as the above explanation, the paging center gives back an announcement of "This is the beeper. Please input your message." and a tone of "Boo, boo, boo" to the voice mail center. After the announcement and the tone are heard, when a message (telephone number) memorized in the message inputting section 6 is sent to the paging center, the paging center gives back an announcement of "Your message is to be sent, please hang up the telephone and wait." to the voice mail center.

On the other hand, in the conventional type beeper, after the voice mail center dials automatically the paging center, the paging center sends a chime voice of "Ping Pong" and an announcement of "The beeper is now being called out. Please hang up the telephone and wait for the contact from the outside." Thereafter the chime voice of "Ping Pong" is heard again.

The tone detecting section 7 is a circuit for discriminating the two kinds of tone, namely "Boo, boo, boo" and "Ping Pong". When the tone "Boo, boo, boo" is discriminated, the message inputting section 6 is triggered. After the message memorized in the message inputting section 6 is sent to the paging center, closing of the voice mail center is released. On the other side, when the tone detecting section detects a chime voice of "Ping pong" from the conventional beeper closing of the voice mail center is released after 10 seconds through the 10 second timer 8. In the paging center, the telephone number sent from the auto dialing section 4 in the voice mail center is decoded by the telephone number detecting section 5. The telephone number detecting section 5 judges whether it is the conventional type beeper or the new type beeper. The beeper is called out through the beeper calling switching section, and also, when the beeper is the new type, the message sent from the voice mail center is sent to the beeper, and is displayed on the display on the beeper 11.

Figure 4:
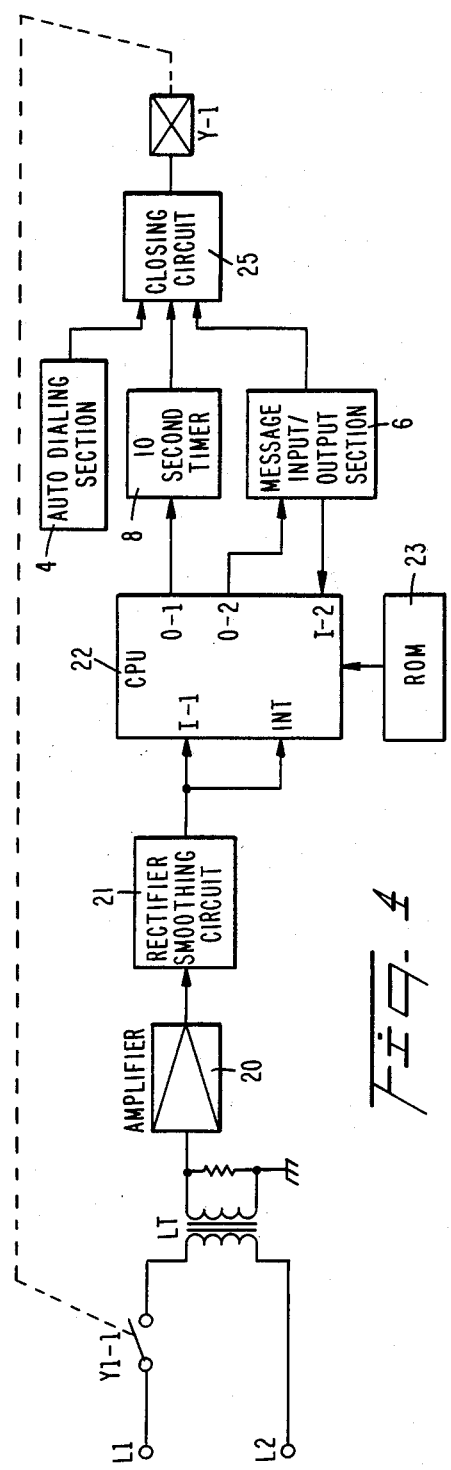
FIG. 4 is a detailed circuit diagram of a principal portion of FIG. 3.

FIG. 4 shows a circuit view of a principal part of the paging system in FIG. 3. In FIG. 4, reference symbols L1 and L2 denote a telephone line. Reference symbol LT denotes a line transformer. Reference numeral 20 denotes an amplifier. Reference numeral 21 denotes a rectifier smoothing circuit for enveloping the signal input to detect the two kinds of tones. Reference numeral 22 denotes a CPU (central processing unit). Reference numeral 23 denotes a ROM (real only memory). Reference numeral 8 denotes the 10 second timer. Reference numeral 6 denotes the message inputting section. Reference numeral 4 denotes the auto dialing section. Reference numeral 25 denotes a closing circuit. And reference symbol Y-1 denotes a relay for closing.

In FIG. 4, when auto dialing is done, the closing circuit 25 is triggered by an output from the auto dialing section 4, the relay Y-1 of a load is set to the operating condition, and the telephone lines L1 and L2 are set to a closed condition by a point of contact Y1-1. In the closed condition, when one tone of the two kinds of tones is input, the tone is amplified by the amplifier 20 through the line transformer LT.

Thereafter the amplified tone is enveloped by the rectifier smoothing circuit 21 and the output from the rectifier smoothing circuit 21 is input to the CPU 22. The same tone is repeated several times in each of two kinds of tone. As a result, the CPU 22 can measure a cycle of the tone and judge that the output is a tone, and does not judge that the output is a voice (announcement), because the output has the same cycle. The CPU 22 can discriminate whether the output is a tone from the new type beeper (Boo, boo, boo...) or from the conventional type beeper (Ping pong, ping pong...). Alternatively, it can be detected by a filter whether the output is a tone from the new type beeper or from the conventional type beeper, because the frequency of each tone is different respectively.

When the tone is for the conventional type beeper, the 10 second timer 8 is triggered by an output from the CPU. After 10 seconds, the closing circuit 25 is reset and the closed condition is released by the output. On the other hand, when the tone is for the new type beeper, the message inputting section 6 is triggered by an output from the CPU 22, and the message (telephone number) memorized in the message inputting section 6 is sent to the telephone lines L1 and L2 by a circuit for sending messages (not shown).

When sending a message is finished, the closing circuit 25 is reset, and closing of telephone line released.

In the new type beeper, when a caller does not leave a message (telephone number) in the message inputting section 6, even if a caller receives an order from the voice mail center, a memory (not shown in the drawings) in the message inputting section 6 is in the clear condition. Accordingly, in FIG. 4, the voice mail center calls out the beeper, before the message (telephone number) memorized in the message inputting section 6, is sent in correspondence with the tone from the paging center.

A memory in the message input section 6 is checked by the CPU 22. As a result when the message (telephone number) is not stored therein, the closing circuit 25 is reset at once by the output from the message inputting section 6 and the closed telephone line is released.

The same applicant has already filed Japanese application No. 55225 of 1985 disclosing a telephone answering device which can operate paging in correspondence with the new type paging system. Namely, when paging against many subscribers is operated automatically by using the voice mail center, not by using the telephone answering device, this invention presents a device which is possible to be used in both the conventional type beeper and the new type beeper in accordance with the order from the paging center called by the caller. As a result, this invention can increase the practical effect of such kinds of device.

Although certain preferred embodiments have been shown and described, it should be understood that many changes and modifications may be made therein without departing from the scope of the invention.

I claim:

1. An automatic paging system which can handle calls for both subscribers of a first type beeper without message display capability and a second type beeper with message display capability, comprising:
    means at a voice mail center which executes a paging service, for detecting (a) an outgoing message which is sent back to a calling party from a paging center when a number of the first type beeper is dialed by the voice mail center, and (b) a first accompanying specific signal;
    means at the voice mail center, for detecting (a) an outgoing message which is sent back to the calling party when a number of the second type beeper with message display capability is dialed by the voice mail center, and (b) a second accompanying specific signal;
    switching means in the voice mail center for switching to first and second states according to whether the outgoing message from the paging center is for said first or second type of beeper, respectively;
    means for disengaging a line in a predetermined fixed time duration after dialing when said switching means is in said first state corresponding to the first type beeper; and
    means for disengaging the line after the calling party sends out his telephone number or other message when the outgoing message for said second type beeper with message display capability is delivered when the switching means is in the second state.

2. The automatic paging system of claim 1, wherein if a calling party does not send out a message (his telephone number and other information) in response to paging a display type beeper with message display capability, and non-sending of a display message is detected, the line to the paging center is disengaged after a predetermined time, thereby to enable the paging center to call a beeper without display capability.

* * * * *